UNITED STATES PATENT OFFICE.

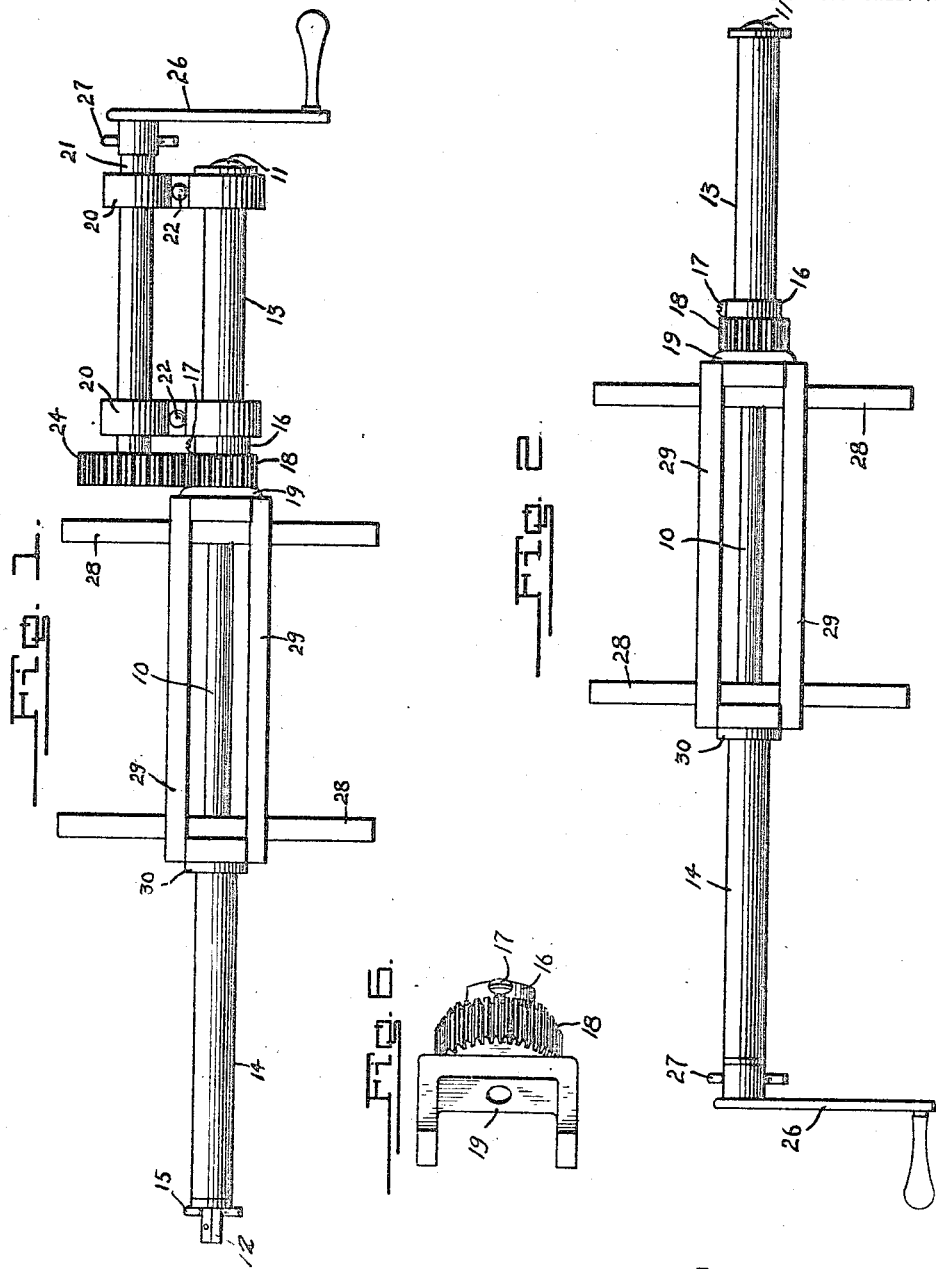

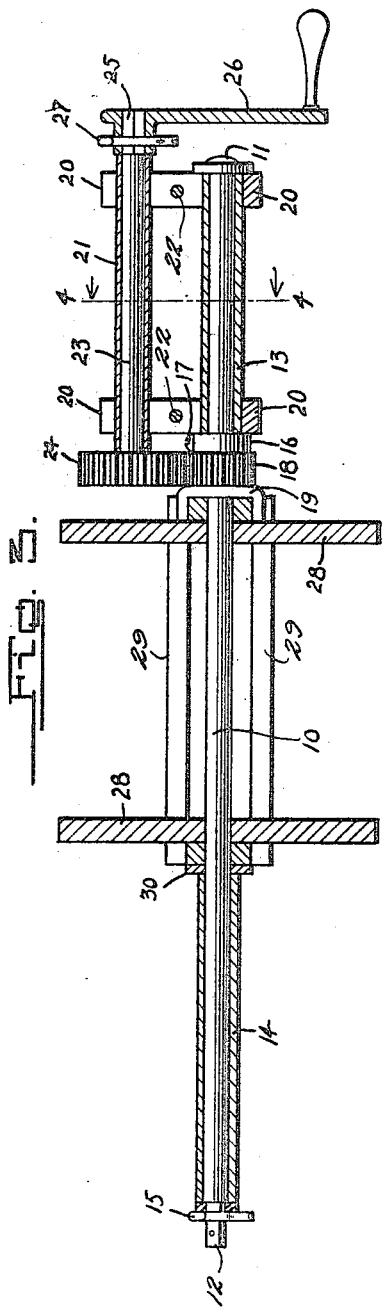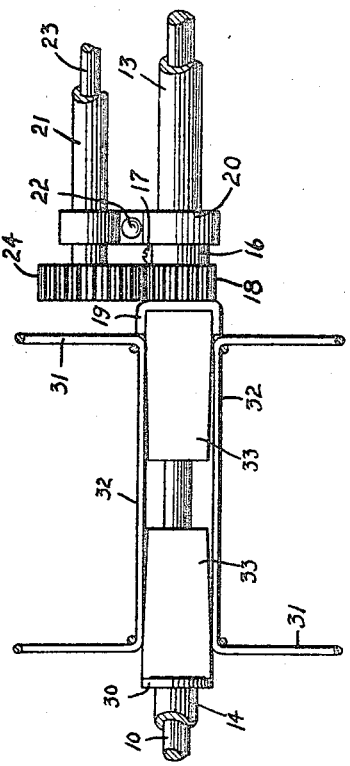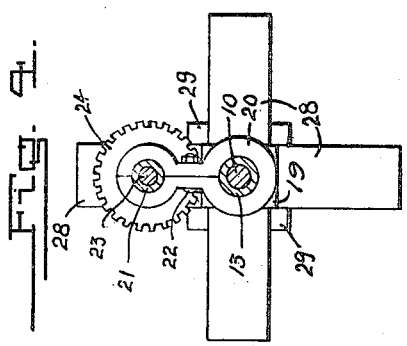

GEORGE J. CASS, OF MEXICO, MISSOURI.

REEL SUPPORT AND TURNER.

1,266,404.  Specification of Letters Patent.  Patented May 14, 1918.

Application filed June 4, 1917. Serial No. 172,821.

*To all whom it may concern:*

Be it known that I, GEORGE J. CASS, a citizen of the United States, and a resident of Mexico, in the county of Audrain and State of Missouri, have invented a certain new and useful Improvement in Reel Supports and Turners, of which the following is a specification.

The present invention relates to winding and reeling apparatus, and has particular reference to a device by means of which a reel may be held and carried by hand, and may also be turned to wind wire and the like thereon.
It is an object of the present invention to provide a support and turner of this character which is adapted to receive reels of various constructions, and permit the easy carrying of the reels for rewinding wire which has been removed from fence posts, to prevent the tangling of the wire, and to provide a support which may also be used in unreeling the wire when it is desired to again use it.
It is another object of the present invention to provide a support of such construction that a reel may be easily and quickly mounted thereon, and to provide a driving means which may be quickly adjusted to the reel, and which includes a handle adapted to be turned while the reel is being carried.

The invention still further aims at the provision of a simplified structure of reel support which may be carried by hand, and to provide the same with turning or operating means for rotating the reel, the means including adjustable devices for directly turning the reel, or for turning the same through intermeshing gear wheels for rotating the reel at an increased speed relatively to that of the handle.

The above, and various other objects and advantages of this invention will be brought out more fully in the following specific description of the present preferred embodiment, the same being illustrated in the accompanying drawings wherein:

Figure 1 is a side elevation of a reel support and turner constructed according to the present invention, and showing an ordinary wooden reel applied thereto.

Fig. 2 is a similar view, taken at right angles to the showing in Fig. 1, and disclosing the turning means adjusted for driving the reel direct.

Fig. 3 is a longitudinal sectional view taken substantially centrally through the support, and a wooden reel mounted thereon.

Fig. 4 is a transverse section taken on the line 4—4 of Fig. 3, showing the mounting of the main and counter-shafts.

Fig. 5 is a front view, partly in section, of the support and turner having a reel of wire construction applied thereto.

Fig. 6 is a detail perspective view of the reel-engaging jaw or clutch member.

Referring to these drawings, wherein similar parts are designated by like reference characters throughout the several views, 10 designates a shaft or spindle which is relatively long, is provided at one end with a fixed head 11, and has upon its opposite end an angular shank or projection 12. This shaft or spindle 10 comprises the body or main portion of the supports, and is adapted to be carried at its opposite end by two persons, one being adapted to operate the turning means for rotating a reel. For this purpose, the spindle 10 is provided at one end with a permanent handle 13, and at its opposite end with a removable handle 14, the latter being arranged adjacent to the angular shank 12. These handles 13 and 14 are in the form of sleeves adapted to turn upon the shaft 10, and the handle 13 engages the head 11 while the handle 14 is held in place by means of a cotter-pin 15 or the like. The shaft 10 is provided, at the inner end of the handle 13, with a clutch member. The clutch member is in the form of a collar 16 surrounding the shaft and adapted to be secured thereto at times by a set screw 17. The collar 16 carries a pinion 18, preferably on the inner end of the collar 16, and an engaging jaw 19 on the inner side or face of the pinion 18. As shown to advantage in Fig. 5, this jaw 19 is substantially U-shaped, and is provided with spaced-apart engaging members for a purpose which will hereinafter appear. The handle or sleeve 13 is provided at its opposite ends, with a pair of bracket arms or clamps 20, each of which comprises, as shown in Fig. 4, a collar encircling the sleeve 13 and having its free end turned outwardly to provide a pair of arms. The arms of each bracket arm or clamp 20 are bowed outwardly at their extremities to form a split collar for the reception of a second sleeve or housing 21. A clamping bolt 22 is secured through the arms of each bracket 20 and is adapted to bind the same upon the sleeves 13 and 21 in various adjusted positions. The sleeve 21 is of a length substantially equal to that of the handle or sleeve 13, and is engaged through both of the bracket arms 20. A counter-shaft 23 is journaled in the sleeve 21 and has upon its inner end a relatively large gear wheel 24 meshing with the pinion 18, and provided upon its outer end with an angular shank 25 adapted to receive thereover the hub of a crank handle 26. A cotter-pin 27, or the like passes through the hub of the handle 26 and said shank 25 to detachably hold the handle on the counter-shaft.

One form of reel is shown in Figs. 1, 2, 3 and 4 of the drawings, wherein the opposite ends or heads of the reel are formed of crossed pieces or arms 28, and the core comprises a plurality of longitudinally extending strips 29 which are secured at their opposite ends to said cross-arms 28 in the angles between the same. The interlocking or clutch jaw 19 is of a width slightly less than the distance between adjacent pairs of said strips 29, and the outturned spaced-apart ends of the jaw 19 are adapted to lap over upon the opposite edges of the outermost cross-piece 28 to hold the reel from turning relatively to the pinion 18. The cross-pieces or arms 28 are apertured at their intermediate crossed portions in the usual manner, and are adapted to receive the spindle or shaft 10 therethrough.

When the reel is in position on the shaft 10, the handle 14 is adapted to hold the reel against the clutch jaw 19 and to thus interlock the reel with the pinion 18. If desired, a washer 30 may be interposed between the outer end of the reel and the inner end of the handle 14 to prevent injury to the reel incident to the turning thereof and the holding of the handle 14 from turning.

In Fig. 5 there is shown a different type of reel which is made of heavy wire, and provided with opposite ends or heads 31 formed integral with the core 32. In this form of reel the aperture through the core 32 is usually very large, and in order to adapt the present invention to support and turn reels of this character, centering or supporting blocks 33 are provided. Many types of reels are provided with rectangular central openings, and the blocks 33 are therefore of a shape to conform to these openings, and are slightly tapered at their inner ends so as to fit into openings varying, to some extent, in size. The outer ends of the blocks 33 project beyond the opposite ends of the reel, and one block is adapted to receive on its outer end the clamping jaw 19 so as to interlock the reel with the clutch member. The opposite block 33 bears against the washer 30 to hold the reel in interlocking engagement with the clutch member.

While the present invention contemplates the provision of a support and turner for various types of reels to wind wire under all conditions met with in the handling of the wire, one use to which the device may be applied is in rewinding fence wire after the same has been loosened from the fence posts, in order to preserve the wire for future use. With this end in view, the cotter-pin 15 is removed from the spindle 10 and the sleeve 14 is then drawn off from the outer end of the spindle. The reel is now slipped over the spindle and adjusted to engage the inner ends thereof in the jaw 19. The washer 30 is now placed up against the reel, and the handle 14 and the cotter pin 15 are again secured to the shaft. When the device is adjusted as shown in Fig. 3, the handle 26 is turned to rotate the counter shaft and turn the intermeshing gears 18 and 24 to thus rotate the clutch member and turn the reel. If desired, during this operation the set screw 17 may be loosened from the shaft or spindle 10 to permit the clutch member to turn freely on the shaft. However, if desired, the set screw may be interlocked with the shaft so that the shaft 10 turns with the reel and with the clutch members. The sleeves or handles 13 and 14 are mounted to turn on the shaft, and are adapted to be grasped in the hands for supporting the device. The gears 18 and 24 are employed when it is desired to turn the reel at an increased speed with respect to that of the rotation of the handle 26. When it is desired, however, to drive the reel directly from the handle 26, it is only necessary to remove the handle from the angular shank or projection 25 of the counter-shaft, and to secure the handle 26 and its cotterpin 27 upon the angular shank 12 of the spindle 10. This adjustment is shown to advantage in Fig. 2, and it is readily seen that upon turning the handle 26 the shaft 10 is rotated, and, when the set screw 17 is set up against the shaft, the reel is forced to turn with the latter. By loosening the bolts 22, the bracket arms 20 may be removed from the handle 13 and the counter-shaft with its gear 24 may thus be removed from the device.

As above described, if the reel has a central opening which is relatively large as compared with the size of the shaft 10, the blocks 33 may be employed for centering the reel upon the shaft, and for providing a suitable connection between the clutch jaw 19 and the reel.

It is of course understood that various changes and modifications may be made in the above-specifically described construction without departing from the spirit of this invention, to adapt the device to various uses, and to conditions met with in the manufacture of the support, such changes and modifications being restricted only by the scope of the following claims.

I claim:

1. In a reel support, the combination of a shaft adapted for insertion through a reel to support the same, a second shaft, reducing gearing connecting the two shafts, and a supporting handle adapted to be interchangeably positioned on the shafts for directly turning the reel and for turning the reel at a reduced speed through the gearing.

2. In a reel support, a shaft adapted for insertion through a reel, a clutch member mounted on the shaft and adapted for interlocking engagement with the reel, a countershaft carried by said first shaft, intermeshing gears on the clutch member and the countershaft, and a detachable handle adapted for engagement with the counter-shaft to turn the clutch member and the reel through said gears, and adapted for adjustment directly on said first shaft for directly turning the clutch member and the reel.

3. In a reel support, the combination of a shaft, a sleeve mounted on each end of the shaft, means for detachably holding one of said sleeves upon the shaft, said sleeve being adapted to be removed and said shaft being adapted for insertion through a reel, a clutch member mounted on the shaft, an engaging jaw carried by the clutch member for engagement with said reel, bracket arms detachably mounted on one of said sleeves adjacent to said clutch member, a countershaft carried by said bracket arms, intermeshing gears on said counter-shaft and said first shaft, a crank handle, and handle-engaging means on said shafts adapted to interchangeably receive the handle for driving the clutch member and the reel directly and through said intermeshing gears.

4. In a reel, the combination of a spindle, sleeve handles mounted on the opposite ends of said spindle, said spindle being adapted to receive thereon between the handle a reel, a collar on the spindle adjacent to one of said sleeves, a pinion on said collar, an engaging jaw carried by the pinion and adapted for interlocking engagement with the adjacent end of the reel, bracket arms outstanding from one side of said sleeves, a second sleeve mounted in the outer ends of said bracket arms, a counter-shaft journaled in said second sleeve, intermeshing gears on said spindle and said counter-shaft, said counter-shaft and said spindle having upon their outer ends angular shank portions, and a crank handle adapted to be interchangeably mounted on said angular portions to turn said engaging jaw and the reel directly through the spindle and indirectly through said intermeshing gears.

5. In a reel support, a spindle, blocks detachably mounted on the spindle and adapted for engagement in the opposite ends of a reel, a clutch member carried by the spindle and engaging one of said blocks, and means for turning said clutch member to rotate the reel.

6. In a reel support, the combination of a spindle adapted for insertion through a reel, centering blocks mounted on the spindle and adapted for engagement in the opposite ends of the reel, a clutch member adapted for interlocking engagement with one of said blocks, and means for turning said clutch member.

GEORGE J. CASS.